United States Patent [19]
Wilcox, Jr.

[11] Patent Number: 4,771,454
[45] Date of Patent: Sep. 13, 1988

[54] RUGGEDIZED EAR PROTECTOR AND COMMUNICATIONS HEADSET

[76] Inventor: Edward R. Wilcox, Jr., 456 Woodside Ave., Youngstown, Ohio 44505

[21] Appl. No.: 38,181

[22] Filed: Apr. 14, 1987

[51] Int. Cl.$^4$ .......................... H04M 1/05; H04R 1/08
[52] U.S. Cl. ...................................... 379/430; 381/72; 381/169; 381/187
[58] Field of Search .................. 379/430; 381/72, 169, 381/183, 187, 205, 25, 151, 26, 67; 455/89; 439/407

[56] References Cited

U.S. PATENT DOCUMENTS

| | | | |
|---|---|---|---|
| 1,810,549 | 6/1931 | Ellen | 379/430 |
| 2,782,423 | 2/1957 | Simon et al. | 2/209 |
| 2,990,553 | 7/1961 | Ulrich et al. | 2/209 |
| 3,117,575 | 1/1964 | Carrell et al. | 128/152 |
| 3,555,207 | 1/1971 | Cech | 379/430 |
| 3,602,329 | 8/1971 | Bauer et al. | 181/23 |
| 3,644,939 | 2/1972 | Beguin | 2/209 |
| 3,661,225 | 5/1972 | Anderson | 181/33 R |
| 3,845,505 | 11/1974 | Davison et al. | 2/209 |
| 4,064,362 | 12/1977 | Williams | 179/1 P |
| 4,087,653 | 5/1978 | Frieder, Jr. et al. | 379/430 |
| 4,114,197 | 9/1978 | Morton | 2/423 |
| 4,499,593 | 2/1985 | Antle | 381/183 |

Primary Examiner—Jin F. Ng
Assistant Examiner—David H. Kim
Attorney, Agent, or Firm—Donald J. Singer; Thomas L. Kundert; Gerald B. Hollins

[57] ABSTRACT

A combination ear protector and communications headset particularly adapted to the rugged, lightweight, convenience needs of aircraft ground crew members. The headset includes a noise cancelling microphone mounted directly on the headband where disposition either before the user's mouth or in an out-of-the-way on-top-of-the-head position is possible. In the ear protection only mode of use, the headset is disclosed to be optimally clean and unencumbered, but is quickly and easily convertable to communication's usage.

10 Claims, 1 Drawing Sheet

RUGGEDIZED EAR PROTECTOR AND COMMUNICATIONS HEADSET

RIGHTS OF THE GOVERNMENT

The invention described herein may be manufactured and used by or for the Government of the United States for all governmental purposes without the payment of any royalty.

BACKGROUND OF THE INVENTION

This invention relates to the field of head suspended ear covering apparatus usable for both protection against high intensity ambient noise and two-way communications with the protected user subject.

Persons obligated to work in high ambient noise environments have been known to incur premature hearing loss and other medically abnormal conditions. The metal fabrication industries, certain construction work, sawmill operation, riveting, and certain types of mineral mining provide notable historic examples of work environments in which hearing loss has resulted from prolonged exposure to impact and other high-energy noises. In more recent times, persons working in close proximity to running aircraft engines, in electrical power generation plants, and as crew members in the gunnery turrets of naval vessels and armored tanks, may be exposed to undesirable levels of sound energy and, without the use of protection equipment, become susceptible to noise-induced physiological problems. In relatively recent times, the advent of occupational safety and health administrations (OSHA) at both the federal and state government levels, has increased the awareness and knowledge needed in preventing prolonged exposure to undesirable ambient noise. The OSHA espoused rules relating noise exposure time inversely with noise intensity have been particularly effective in reducing the incidence of work-related hearing difficulties.

This new awareness, together with worker preference for convenient, lightweight and reliable hearing protection apparatus and the inherent requirement for a protected worker to communicate with other persons in his environment, has created a need for improvements in the hearing protection/communications equipment art. An opportunity for well-considered, simple and rugged equipment of this type is clearly illustrated by the working environment of a military ground crew member in the aircraft maintenance or arrival and departure operations of a U.S. Air Force base.

In this environment there is often a requirement for a ground crew member, positioned on the outside of an aircraft with a running engine to have the benefit of both ear-defending ambient noise protection and communication with the pilot or other crew-members stationed inside the fuselage of the aircraft. In a slight variation of this scenario, a ground crew member can expect to need hearing protection without needing to converse with the aircraft crew. Such needs often occur where the aircraft of interest is in motion or where ear protection is needed from the sound generated by adjacent aircraft, or where power tools such as air driven drills or racheting devices, must be used in the confined spaces of an aircraft. Since the need transition from simple ear protection to ear protection combined with communications capability can be expected to occur frequently and on short notice in the activites of ground crew personnel. it is desirable to provide such persons with a single piece of headset equipment that is capable of performing both the ear protecting and communications functions with reasonable efficiency. In the interest of assuring optimum ear protection and desirable headband characteristics as are discussed below herein, the preferred equipment for such usage is in the nature of ear protection that is also provided with communications capability rather than communications apparatus that is used secondarily for ear protection.

In the Air Force ground crew environment, experience has shown that operating lifetime and ability to withstand hard usage are especially demanding additional requirements for headset equipment. In the ground crew work environment, hostile events in the nature of inclement weather conditions, headset droppage or other physical abuse, atmospheric dust and dirt and intense subjection to human body by-products such as moisture, salt, and organic oils, are expected headset operating life considerations. The prospect of droppage and other physical abuses is particularly great for equipment of this type. Such physical abuse and the other hostile conditions encountered frequently impose repeated repair requirements and general unreliability as expected attendants of using heretofore available headset equipment.

SUMMARY OF THE INVENTION

The present invention therefore provides a single headset capable of meeting the needs of aircraft ground crew members and other persons working in a hostile, high-noise, two-way communications environment. The headset of the invention provides in a single piece of apparatus a clean-cut and unencumbered and convienent-to-the-user ear protection apparatus while also making available with minimal time and changeover effort a reliable, and rugged communications headset apparatus.

It is an object, therefore, of the present invention to provide a combination ear protection and communications headset especially adapted to the needs of aircraft ground crew members.

It is another object of the invention to provide a ruggedized field use adapted combination ear protection and communications headset.

It is another object of the invention to provide a combination ear protection and communications headset in which the tether-free and unencumbered nature of the hearing protection apparatus is quickly and conveniently changed by repositioning and the addition of a connecting cable into an effective communications headset.

It is another object of the invention to provide a combination hearing protection and communications headset which is rugged in oonstruction and capable of long operating life in a typical field Work environment.

It is another object of the invention to provide a combination ear protection and communications headset which can employ a variety of different communications elements.

It is another object of the invention to provide a hearing protection and communications headset which can be realized through field modification of existing available equipment.

It is another object of the invention to provide a headset which is of minimal parts count and is physically unencumbering in nature.

It is also an object of the invention to provide a combination hearing protection and communications headset having such desirable and convenient features as to encourage the use thereof.

It is a further object of the invention to provide a combination hearing protection and communications headset which is of a low maintenance and high operating reliability nature.

Additional objects and features of the invention will be understood from the following description and the accompanying drawings.

These and other objects of the invention are achieved by headset apparatus which includes the combination of a pair of ambient noise attenuating enclosure members disposable surrounding the external ears of a human user, spring-loaded headband apparatus rotatably attached at opposite ends thereof to each of the on enclosure members and alternately disposable over the head and before the face of the human user in first and second elective positions thereof and for supporting the enclosure members over the user external ears, microphone apparatus directly mounted on the headset means and disposable on the top of the user's head in a first headband apparatus elective position and adjacent the mouth of the user in a second headband apparatus elective position for generating, while in the headband apparatus second elective position, a user speech representative electrical signal, audio signal communicating apparatus disposed in the enclosure members for conveying audio signal information to the ears of the human user, flexible conduit means detachably connected to one of the headband apparatus, the microphone apparatus, or enclosure members for conveying human user communication signals between the microphone means and audio signal communicating means fixedly disposed with respect to the user, whereby the headset serves as a simple and unencumbered ear protection apparatus in the headband apparatus first elective position first utilization mode, and as a ruggedized communications headset in the headband apparatus second elective position, second headset utilization mode, and requires only headband apparatus repositioning and flexible conduit means attachment between the first and second utilization modes.

DETAILED DESCRIPTION

Figure 1:
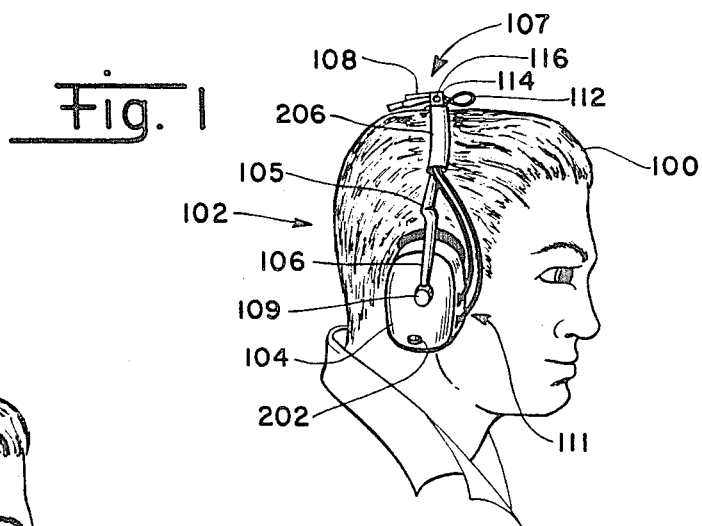
FIG. 1 shows use of an apparatus in accordance with the invention in the ambient noise attenuating ear protecting use mode thereof.

FIG. 1 of the drawings shows a human user subject 100 wearing a combination ear protection and communications headset 102 made in accordance with the present invention. The headset 102 in FIG. 1 includes a shell member 104 which is disposed surrounding the right outer ear of the user subject 100; this shell member 104 is supported in the FIG. 1 position by a headband member 106 which is preferably of the spring-loaded metal strap type, and may include contour conforming and headband spring tension adjusting offsets of the type shown at 105 in FIG. 1. The headband 106 is presumed to be continuous in nature and to extend between the shell member 104 and a similarly disposed shell member located over the left ear of the user subject 100, but not shown in FIG. 1. The two shell members are retained in the FIG. 1 indicated position over the ears of the user 100 by a combination of frictional force between each of the shell members and the cranial-facial surface of the user 100, and positive tensile support arising from positioning of the headband 106 over the top of the user's head or upper cranial surface.

Located along the headband member 106 in a position near the midpoint thereof, is a microphone assembly 107. The microphone assembly 107 is shown in FIG. 1 and also in FIG. 4 to include a microphone element 108, a microphone mounting bracket 114, and a microphone retaining screw or tensile member 116. Also shown in FIG. 1 is a cover-housing 109 for a threaded stud member 110 by which the shell member 104 is attached flexibly and rotatably to the headband member 106—in a manner which is shown in greater detail in FIG. 3 of the drawings. At 112 in FIG. 1 there is shown an electrical conductor member by which signals representing the audio information received by the microphone 108 are conveyed to the interior cavity of the shell member 104 for subsequent conveyance to a connecting jack or other signalling means fixedly disposed with respect to the user subject 100. In the FIG. 1 represented position of the headset 102, usage exclusively in the ear protection mode is contemplated.

Figure 2:
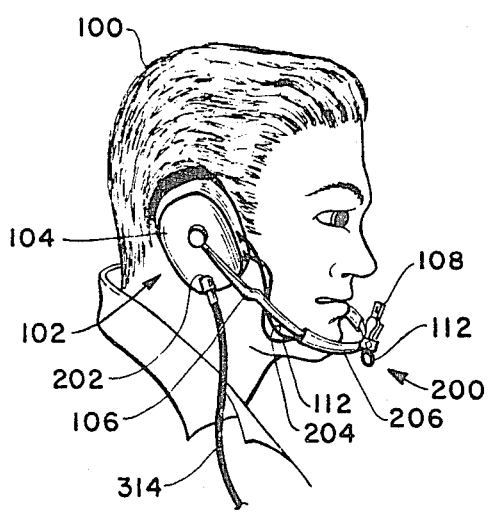
FIG. 2 shows use of an apparatus in accordance with the invention apparatus in the combination ear protecting and communications use mode.

In FIG. 2 of the drawings there is shown a second view of the headset 102 as this apparatus appears when disposed in a position 200 affording both ear protection and communications ability to the user subject 100. In the FIG. 2 headset disposal, the shell member 104 remains in the same relative location as shown in FIG. 1 with respect to the user subject 100, however, the headband member 106 has been rotated from the FIG. 1 illustrated top-of-the-head position to the FIG. 2 illustrated front-of-the-face position in order that the microphone element 108 is disposed adjacent the user's mouth for receiving acoustic signal energy resulting from the user's speech. In the FIG. 2 position of the headband 106, engagement of the shell member 104 with the user's ear-surrounding cranial-facial surface is maintained solely by the above-described frictional engagement. This frictional engagement is made sufficient to support the headset by way of the shaping and spring constant characteristics of the headband 106. The spring characteristics commonly used in ear protection headsets easily meet these needs and allow satisfactory long-term disposal of the headset in the position shown in FIG. 2.

Also shown in FIG. 2 is connector member 202 by which signals originating in the microphone element 108 may be conveyed to a flexible tether cord for subsequent connection to apparatus that is fixedly mounted with respect to the user 100. In the case of an aircraft ground crew member, this fixed object may, of course, be the aircraft which is being served by the ground crew member. The connector 202 may also be used for conveying signals of an electrical or other nature to the interior cavity of the shell member 104 for communication with the user's ear. As explained below in greater detail, both the ear and microphone communication signals are preferably arranged to be electrical in nature, but may, however, be of an audio or acoustic nature wherein pneumatic or pressurized fluid connections are arranged in the connector 202. The conductors 112 and 204 are arranged to have length and routings about the headset apparatus such as will enable rotation of the headband 106 to either the FIG. 1 or FIG. 2 position without conductor interference. The FIG. 1 and FIG. 2 illustrated frontal entrance of the conductors 112 and 204 into the shell 104 is compatible with this requirement.

Figure 3:
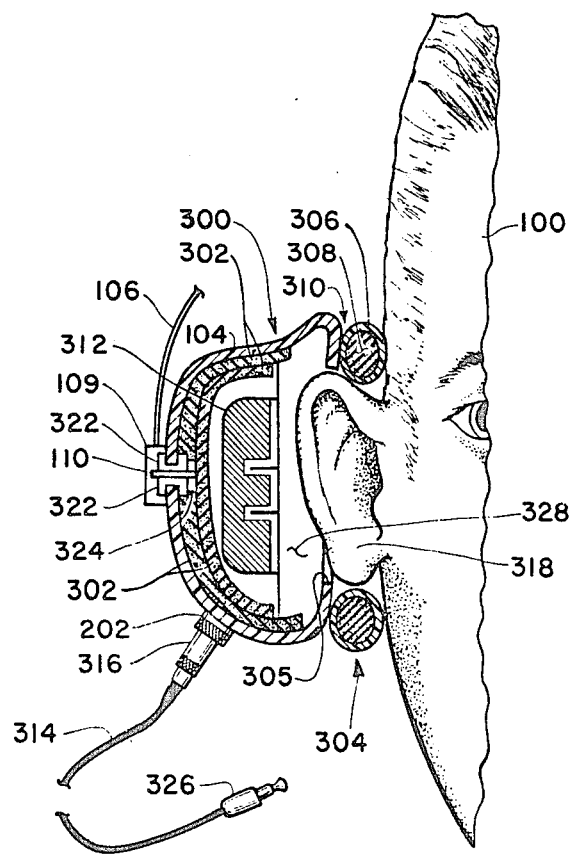
FIG. 3 shows details of the internal construction of apparatus made according to the invention.

Additional details of the FIG. 1 and FIG. 2 illustrated ear protection and communications headset 102 are shown in FIG. 3 of the drawings in a cross-sectional view of the shell member 104 which also shows the interior cavity 328 and the components mounted therein. Included in the FIG. 3 view are the user subject 100, the shell member 104, the headband member 106, threaded stud member 110 and cover-housing 109, which were all shown in FIGS. 1 and 2, along with an acoustic energy absorbing liner 302 located within the cavity 328. The acoustic energy absorbing liner 302 is preferably made from plastic foam or other pressure wave energy-absorbing materials which are known in the art.

Also shown in the FIG. 3 cross-sectional view is a resilient sealing member 304 which is disposed around an ear receiving aperture 305 in the shell member 104. The aperture 305 is shown to at least partially enclose or surround the outer ear 318 of the user 100. The resilient sealing member 304 is shown in FIG. 3 to include a plastic or rubber foam-filled interior 308 which is surrounded by a doughnut-configured flexible plastic shell 306. The resilient sealing member 304 serves both to seal the interior cavity 328 of the shell member 104 with the cranial surface of the user 100 and thereby exclude external noise from the user's ear. and also serves to disperse force originating in the headband member 106 and tending to urge the shell member against the user's cranial surface in a user-comfortable and fatigue-reducing manner. The flexible plastic shell 306 may be retained in engagement with the shell member 104 by way of frictional or adhesive attachments disposed in the interface region 310, as is known in the art.

Also shown in FIG. 3 is a cross-sectional representation of an electrical-to-audio signal receiver transducer element 312 which may be used for conveying audio signals to the ear of the user 100. The tether cord 314 and electrical connector members 316 used in conveying electrical signals to the transducer 312 and the microphone 108 is also shown in FIG. 3. The tether cord 314 is terminated at its distal end in a multiple circuit connector 326 which may be of the type known in the art. The tether cord 314 and a second proximate end electrical connector 316 are arranged to be easily disengageable from the headset 102 by way of an electrical connector 202 that is permanently attached to the shell member 104. Electrical wires which are not shown in FIG. 3 are, of course, used to convey electrical signals between the connector 202 and the transducer element 312 and also between the connector 202 and the conductor member 112 that conveys signal from the microphone element 108.

Rubber grommets are preferably used to seal the wire-receiving holes in the region 111 of the shell member 104 where wiring or pneumatic tubes connected with the microphone 108 and the opposite ear shell member enter the shell 104—in order to protect the wire insulation from chafing and to seal the shell member 104 against entrance of undesired ambient noise. The opposite ear transducer element and the transducer element 312 may be connected either in electrical parallel or series, or if desired, may have one common connection and one each non-common connection carried to the connector 326 for the purpose of achieving stereophonic communication with the user 100. An existing assembly such as the gavitt WD-34/U wire cord assembly may be used for the tether cord 314; this cord may also be of the multiple-conductored electrical cord type such as the cord assembly known by the U.S. Government National Stock Number 5995-00-715-6190 with a suitable adaptation for use with the connector 316. This latter electrical cord assembly is equipped with a plug of the U-174/U type which may be used as the multiple circuit connector 326 in FIG. 3.

FIG. 3 of the drawings also shows details of the arrangement by which the headband 106 is mounted to be flexible and rotatable with respect to the shell member 104. This mounting may include, for example, the use of a rubber grommet 322 for connecting the threaded stud member 110 to the shell member 104 and may also include the threaded nut member 324 by which the threaded stud member 110 is retained captive in its engagement with the shell member 104. The threaded nut member 324 may be frictionally engaged with the stud member 110 through either the use of special binding threads in the nut or by use of frictional materials such as rubber in the nut 324 as is known in the fastening art. The cover-housing 109 may be arranged to snap over the end of the headband 106 and the grommet 322 or to engage a special retainer ring mounted on the shell 104 (but not shown in FIG. 3) in the manner commonly known in the plastics art. The headband to shell member engagement involving the rubber grommet 322, the threaded nut 324 and the threaded stud 110 may, of course, be replaced by ball and socket and other captive but flexible engagement arrangements known in the mechanical art. Connection of the headband 106 to the shell member 104 should provide reasonable rotational freedom and allow easy positioning of the headband 106 between the positions shown in FIGS. 1 and 2 while also conveying the headband tenslon force to the shell member 104 and also frictionally retaining the headband 106 and microphone 108 in the desired mouth-adjacent position shown in FIG. 2.

Figure 4:
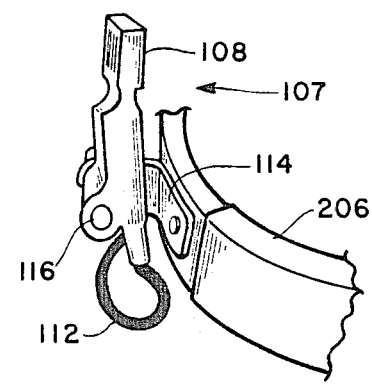
FIG. 4 shows a portion of the FIG. 2 apparatus in greater detail.

With respect to components for the FIG. 1-3 apparatus, the microphone element 108 is preferably a moving coil dynamic microphone of the noise-cancelling type. Frequently such microphones have both frontal and rearward exposed openings that operate to cancel ambient noise induced signals from the microphone response while also enhancing unidirectional signals originating in the mouth of the user 100. Microphones such as the M-87/AIC dynamic microphone made by Electro-Voice Incorporated and identified also by the Federal Government National Stock Number of 5965-00-845-5500 may be used with the invention. Such microphones also have a two-degree of freedom pivotal mounting arrangement as shown in FIG. 4 of the drawings and thereby allow optimum disposal of the microphone with respect to the user's mouth; such microphones additionally, are provided with an electrical disconnecting member which may be used in replacing or removing the microphone from the headset assembly. The microphone 108 may be mounted on the headband 106 by way of an L-bracket 114 such as the bracket known by the National Stock Number 9600-050, the bracket being pivotally riveted to the headband 106 as shown in FIG. 4 in order that both pivoting about the rivet (tilting with respect to the plane of the headband) and pivoting about the microphone to L-bracket retaining screw 116 afford a two degree of freedom mounting for the microphone.

The headband 106 is preferably made from spring metal and may be made adjustable in length if desired. The headband metal is preferably covered with plastic or other padding material for user comfort and durability. The conductors 112 and 204 may be attached to the headband by way of heat shrink plastic tubing 206 or other known attachment arrangements. Both the headband and the shell members 104 may be comprised of an off-the-shelf ear protector device such as the aural protector model E-310 manufactured by David Clark Company Inc. and also known by the National Stock Number of 4240-00-022-2946 and additionally identified by the military specification MIL-P-382688 Type II and purchased under Defense Logistics Agency contract DLA 400-81-C-5193. The shell members 104 in the preferred ear protector and in the David Clark ear protector are made from a rigid plastic or other organic material.

The connector 202 which is permanently mounted on the shell member 104 may, in the case of an electrical transducer 312 and microphone 108 be a four or more pin electrical connector such as the four-pin connector part number 274-001. which is sold by the Radio Shack division of Tandy Corp. and commonly used for microphone connection to a citizen's band transceiver. The conductors 112 and 204 may be of any convenient multiple conductor wire type; preferably multi-conductor shielded wire is used for the microphone 108 and multiple-conductored non-shielded wire for connecting the opposite shell transducer.

The transducers 312 may be any convenient earphone or telephone type receiver transducer; transducers from the headset type H-133C/AlC which is also manufactured by the David Clark Company, may be used. Alternate transducers such as the H-136/AlC or H-143/AlC sold by David Clark Company, may also be used. Preferably transducers of this type are disposed in the interior cavity 328 in a positive manner by way of riveting or other mechanical attachment accomplished on the annular flange surrounding the ear receiving aperture 305. The transducers are preferably hermetically sealed against the entry of dust and moisture. The conductors 204 and 112 are secured to the headband 106 using an arrangement such as the heat shrink tubing 206 or other attachment arrangements which do not interfere with mechanical integrity of the headband member 106.

Alternate arrangements of the FIGS. 1-4 illustrated apparatus are also within contemplation of the invention. One such alternate arrangement might, for example, include the previously recited elimination of one or both of the microphone and receiver transducer elements 108 and 312 by employing pneumatically coupled signal transmission arrangements such as in the medical stethoscope or in the plastic earphone sets used aboard airline aircraft for passenger reception of music and entertainment media. Pneumatic coupling of the user's voice or ear signals would of course, involve the use of pneumatic couplings in the connectors 202 and 316 and pneumatic tube pathways in the tether 314 and the connector 326. Other shell arrangements, other shell-to-headband attachment arrangements, and other energy absorbing arrangements within the interior cavity 328 are, for example, also within contemplation of the invention.

It is notable that the described invention has avoided a "boom mounting" of the microphone 108, as has been common practice in the lightweight telephone type of headsets. Such "boom mounting" of a headset component is found to be both interference prone and damage-susceptible in the field use environment of an aircraft ground crew member. It is also notable that the described arrangement of the invention permits the user to wear a hat or cap during extreme weather or other use conditions and that moreover, such a hat or cap also serves to fully protect the microphone 108 from inclement weather exposure when the headset is disposed in the FIG. 1 position on a user. Since the receiver transducer 312 is inherently protected from inclement weather by the housing 104 and the resilient sealing member 304 when worn in the FIG. 1, FIG. 2 or FIG. 3 positions, the headset is therefore fully protected from weather damage when worn with a hat and disposed in the FIG. 2 position. Wearing the headset in the FIG. 1 described position is also notably convenient and unobtrusive to a busy user, since the illustrated flat-against-the-head disposal of the microphone 108 is without danger of entanglement in or obstruction of the user's normal activity.

The headset apparatus described herein is contemplated to be carried about without the tether wire 314 attached when not in use. Such carrying may occur, for example, when the headset is suspended from the belt of the user, wrapped around the user's neck, or suspended above an ear-surrounding position on the user's head. By way of the described nature of the headset, therefore its utilization for ear protection and/or communication purposes may be easily arranged from such carrying positions by simply repositioning the shell members 104 over the user's ears, for ear protection and by additionally moving the headband 106 to the FIG. 2 position, joining the connectors 202 and 316 and engaging the connector 326 for combined ear protection and communications use. The tether cord 314 may be carried about in the user's trouser pocket, in a tool kit or other convenient location when not in use.

The combined use of the headband 106 for the normal support and pressure achieving functions of a headband and also as a convenient and rugged mounting situs for the microphone assembly 107 is therefore an enabling and notable aspect of the invention. The achievement of a lightweight, rough-usage immune, multi-function headset comprise additional notable aspects of the invention.

While the apparatus and method herein described constitute a preferred embodiment of the invention, it is to be understood that the invention is not limited to this precise form of apparatus or method, and that changes may be made therein without departing from the scope of the invention, which is defined in the appended claims.

I claim:

1. Headset apparatus comprising the combination of:
a pair of rigid shell enclosure members each having organic material shell walls, an interior cavity defined by said shell walls and shaped to be disposable over the ear of a human user test subject with a shell wall aperture portion located immediately surrounding said user subject outer ear portion;
spring-loaded curved trajectory metallic band means flexibly coupled at each end thereof to one of said shell members and disposable over the upper cranial surface of said user subject in substantial conformity therewith in a first pivotal position thereof and around the frontal facial surface of said user subject in a second pivotal position thereof for holding said shell members positioned surrounding said user subject outer ear portions in both of said first and said second metallic band means pivotal positions;

acoustic energy absorbing means disposed in each of said hollow cavity shell members between the outer surface thereof and said user subject ears for attenuating acoustic energy signals communicating with said ears via said shell interior cavity;

resilient sealing means surrounding the periphery of said shell member aperture and disposable between said shell member and the ear adjacent cranial surface of said user subject for sealing the interface between said user and said shell members against acoustic energy leakage and for dispersing said spring loading force over the surface of said user subject ear adjacent cranial surface;

acoustic signal to electrical signal microphone transducer means, including a noise canceling microphone having acoustic signal admitting openings located in oppositely facing surfaces thereof, centrally mounted on said spring-loaded metallic band means for generating an electrical signal representative of sounds spoken by said user subject when said metallic band and said microphone transducer means are disposed in said second pivotal position thereof said microphone, having one long and a pluralilty of shorter overall dimensions with said long dimension being disposed substantially parallel with the upper cranial surface of said user subject in said metallic band means first pivotal position and substantially parallel with said frontal facial surface of said user subject in said second metallic band pivotal position;

electrical signal to acoustic signal receiver transducer means mounted in one of said shell member hollow interior cavities and disposed adjacent the outer ear of said user subject for communicating externally originated information to said user subject;

electrical conductor means disposed along said spring loaded metallic band means for communicating said microphone transducer means electrical signal to the interior cavity of a predetermined one of said shell members; and electrical circuit connector means including male and female matable and disengageable multi-conductored electrical connector members, one terminating a multi-conductor flexible tether cord and one mounted transverse of the shell wall portion of said predetermined shell member for receiving said tether cord connector member onto said defender apparatus and for communicating said microphone electrical signal and said receiver transducer means electrical signals between said ear defender apparatus and a fixed point in the environment of said user subject:

whereby said apparatus is usable as a tether and encumbrance-free ear protector in a first functional use mode and as a rough service, long endurance, high ambient noise tolerant communications headset in a second functional use mode.

2. The apparatus of claim 1 further including second electrical signal to acoustic signal receiver transducer means mounted in the remaining of said shell members and second electrical conductor means disposed along said spring-loaded metallic band means for electrically interconnecting said second receiver transducer means with said electrical circuit connector means.

3. The apparatus of claim 1 further including resilient sealing means located intermediate said electrical conductor means and the organic shell material of said predetermined shell member for admitting said electrical conductor means to said shell interior cavity while excluding said ambient noise therefrom.

4. The apparatus of claim 1 wherein said receiver transducer means is physically attached to said predetermined shell member by riveting.

5. The apparatus of claim 1 further including first and second adjustable pivot mounting means for mounting said microphone transducer means on said metallic band means with two degrees of adjustment freedom.

6. Convertible headset apparatus comprising the combination of:
a pair of ambient noise attenuating enclosure members disposable surrounding the external ears of a human user;

spring-loaded curving headband means rotatably attached at opposite ends thereof to each of said enclosure members and alternately disposable over the head and before the face of said human user of said apparatus in first and second elective positions thereof for supporting said enclosure members over said user external ears and supporting said apparatus on said user;

microphone means including a microphone member extending perpendicularly to a plane defined by said curving headband means and directly mounted on said headband means and disposable on the top of said user's head in said first headband means elective position and adjacent the mouth of said user in said second headband means elective position for generating, while in said headband means second elective position, a user speech representative electrical signal;

audio signal communicating means disposed in said enclosure members for conveying audio signal information to the ears of said human user; and flexible conduit means detachably connected to one of said headband means, microphone means, and enclosure members, for conveying human user communication signals between said microphone means and audio signal communication means and fixedly disposed signalling means;

whereby said headset serves as a single and unencumbered ear protection apparatus in said headband means first elective position first utilization mode and as a ruggedized communications headset in said headband means second elective position second headset utilization mode and requires only headband means repositioning and flexible conduit means attachment between said first and second utilization modes.

7. The apparatus of claim 6 said audio signal communicating means includes a pair of electrical signal to audio signal transducer elements disposed one each in each of said enclosure members.

8. The apparatus of claim 7 wherein said flexible conduit means includes multiply-conductored electrical cable and electrical connector members and wherein a mating multiply-conductored electrical connector member is received on one of said enclosure members.

9. The apparatus of claim 6 wherein said microphone means also includes ambient noise cancelling apparatus.

10. Ruggedized ear defending and communications headset apparatus for convenient intermittent use by an aircraft ground crew member in working proximate running aircraft and comprising the combination of:

a pair of rigid shell enclosure members each having organic material shell wall structures, an interior cavity portion disposed internal of each shell wall and a shell wall aperture portion communicating between the exterior of each said enclosure and said interior cavity portion, each said shell wall aperture also being receivable surrounding an outer ear structure of said aircraft ground crew member;

resilient sealing means disposable around the external periphery of each said shell member aperture portion between said shell member and the ear adjacent cranial surface of said ground crew member for sealing the interface between said ground crew member cranial surface and said shell member aperture against acoustic energy leakage and for dispersing shell retaining normal force over a substantial area of said ground crew member cranial surface;

spring loaded curved trajectory metallic headband means pivotally coupled at each end thereof to one of said shell members and disposable, in a first pivotal position thereof, over the upper cranial head surface of said ground crew member in substantial conformity therewith and in a second pivotal position thereof around the frontal facial surface of said ground crew member, for generating said normal force and for holding said shell members positioned surrounding the outer ear portions of said ground crew member;

acoustic energy absorbing means disposed in each of said shell member interior cavity portions between the shell outer surface and said ground crew member ears for attenuating acoustic energy signals communicating with said ears via said interior cavity;

electrical signal to acoustic signal receiver transducer means including a receiver element rigidly mounted in each of said shell member interior cavities and disposed adjacent each of said ground crew member ears for communicating externally originated information to said ground crew member;

acoustic signal to electrical signal microphone transducer means centrally mounted on said spring loaded curved trajectory metallic headband means for generating an electrical signal representative of spoken sounds by said user subject while said metallic headband and said microphone transducer means are disposed in said second pivotal position around said ground crew member frontal facial surface, said microphone transducer means including a noise canceling moving coil dynamic microphone member having acoustic signal admitting openings located in oppositely disposed frontal and rearward surfaces thereof and having one long and a plurality of shorter physical dimensions with said long dimension being disposable along a central front to back axis of said air crew member upper cranial surface in said second headband means pivotal position;

mounting means including first and second adjustable pivot members rotatable about each of a pair of orthogonal axes located in the plane of said curved trajectory metallic headband means for mounting said microphone member with two degrees of adjustment freedom on said metallic headband mean adjacent the mouth of said ground crew member while said headband means is disposed in said second pivotal position thereof;

electrical conductor means disposed along said metallic headband means between a first one of said rigid shell enclosure members and said microphone member and between said first and the second of said rigid shell enclosure members for communicating electrical signals between said microphone member and said interior cavity portion of said first rigid shell enclosure member and between said first and second shell enclosure member interior cavities;

resilient sealing means located intermediate said electrical conductor means and the organic material of said shell enclosure members for admitting said electrical conductor means to said shell enclosure member interior cavity portions while sealably excluding ambient external noise from said interior cavity portions;

electrical circuit connecting means including a multi conductored flexible tether cord and multi conductored male and female mateable connector members one mounted transverse of said first rigid shell enclosure member and one mounted on one end of said flexible tether cord for communicating said receiver and microphone transducer electrical signals between a fixed point in the environment of said ground crew member and said first rigid shell enclosure member in a connector mated condition thereof and for freeing said headset apparatus of tether encumberances in the non mated connector condition thereof;

whereby said headset apparatus enables replacement of the separate communications headsets and ear defender headsets normally carried by said ground crew member with a single dual function convertible headset of desirable ruggedness, convenience and utility.

* * * * *

UNITED STATES PATENT AND TRADEMARK OFFICE
CERTIFICATE OF CORRECTION

PATENT NO. : 4,771,454

DATED : September 13, 1988

INVENTOR(S) : Edward R. Wilcox, Jr.

It is certified that error appears in the above-identified patent and that said Letters Patent is hereby corrected as shown below:

```
Col 1, line 64, replace "Sinoe" with --Since--.
Col 1, line 64, delete the word "need".
Col 1, line 68, replace the "." after "personnel" with a --,--.
Col 2, line  1, replace the bold face number "1" in
      "capable" with a standard type face letter --1--.
Col 2, line 56, replace "Work" with --work--.
Col 3, line 17, delete the word "on".
Col 5, line 33, replace the "." after "ear" with a --,--.
Col 6, line 40, replace the bold face number "1" in
      "tenslon" with a standard type face letter --i--.
Col 7, line 26, replace the "." after "274-001" with a --,--.
Col 10, Claim 6, line 31, replace "communication" with
      --communicating--.
Col 10, Claim 7, line 1, after "claim 6" insert --wherein--.
```

Signed and Sealed this

Fourteenth Day of March, 1989

Attest:

DONALD J. QUIGG

Attesting Officer

Commissioner of Patents and Trademarks